United States Patent
Todman

Patent Number: 5,635,917
Date of Patent: Jun. 3, 1997

[54] BAG INCLUDING AN ENCODABLE DEVICE RESPONSIVE TO REMOTE INTERROGATION AND AN ASSOCIATED FABRICATION METHOD

[75] Inventor: Victor Todman, Histon, United Kingdom

[73] Assignee: Trigon Cambridge Limited, England

[21] Appl. No.: 146,140

[22] PCT Filed: Mar. 31, 1993

[86] PCT No.: PCT/GB93/00671

§ 371 Date: Nov. 3, 1994

§ 102(e) Date: Nov. 3, 1993

[87] PCT Pub. No.: WO93/19993

PCT Pub. Date: Oct. 14, 1993

[30] Foreign Application Priority Data

Mar. 31, 1992 [GB] United Kingdom ............. 9206974

[51] Int. Cl.$^6$ .................................. H04Q 9/00
[52] U.S. Cl. .................. 340/825.37; 340/825.54; 340/825.31; 340/572; 340/541
[58] Field of Search ............ 340/825.37, 825.54, 340/825.34, 825.31, 541, 550, 568, 572, 652

[56] References Cited

U.S. PATENT DOCUMENTS

| | | | |
|---|---|---|---|
| 3,665,449 | 5/1972 | Elder et al. | 340/572 |
| 4,352,097 | 9/1982 | Hamann | 340/572 |
| 4,399,437 | 8/1983 | Falck et al. | 340/825.54 |
| 4,711,368 | 12/1987 | Simons | 340/572 |
| 4,857,893 | 8/1989 | Carroll | 340/572 |
| 5,237,307 | 8/1993 | Gritton | 340/572 |
| 5,406,263 | 4/1995 | Tuttle | 340/572 |

FOREIGN PATENT DOCUMENTS

| | | |
|---|---|---|
| 0512543 | 11/1992 | European Pat. Off. |
| 8703979 | 7/1987 | WIPO |
| WO91/15406 | 10/1991 | WIPO |

*Primary Examiner*—Edwin C. Holloway, III
*Attorney, Agent, or Firm*—Bell, Seltzer, Park & Gibson, P.A.

[57] ABSTRACT

A security bag includes an electronic memory device which may be read remotely using non-visual means. A method of processing such a bag comprises the steps of encoding information onto the tag in non-visible form, retaining the device on or in the bag, and subsequently retrieving the information. A variant provides the memory device of the electronic tag and the electromagnetic or inductive coil being separately located and connected across the seal of the bag by a conductor designed to break upon attempted opening of the bag.

5 Claims, 4 Drawing Sheets

BAG INCLUDING AN ENCODABLE DEVICE RESPONSIVE TO REMOTE INTERROGATION AND AN ASSOCIATED FABRICATION METHOD

The present invention relates to bags, in particular to bags for the secure transportation of goods and, more particularly to bags wherein a visible and/or other indication is provided if any attempt is made to gain access to the contents of the bag. Various bags of this type are known, of which those described in our patent No. GB 2 149 381, our European patent application No. 0 396 428 and our British patent application No. 9008276.9 are examples.

Such bags are used by, for example, banking establishments for transmitting specified sums of money from one department to another or between the establishment and its customers. The system operated by the establishment is ordinarily such that the establishment can readily ascertain if the bag is stolen in transit. This system often involves marking each bag with an individual identification number, for example by printing. The number corresponding to each bag is recorded in a "log book". However, this system is both time consuming and also subject to errors in transcription and subsequent reading of the number recorded in the log book and on the bag.

These problems have been alleviated to some extent by encoding the identification number as a bar-code which is printed onto the bag and which can be read into a computer which can print the number, for the purposes of the "log book". However, the bar code is subject to degradation by scratching, scuffing, stretching or marking of the bag in use and may become unreadable. Also, it is usually necessary to manipulate each bag to ensure that it is arranged in the correct orientation for the bar code to be read, and this is still time-consuming.

The present invention seeks to provide a bag, in particular a security bag, wherein the identification number is provided in a manner which is substantially not subject to degradation in use, which can be read rapidly, with consistent accuracy and preferably irrespective of the orientation of the bag.

Accordingly, one aspect of the present invention provides a bag including a device, such as a memory device, encodable with information, which information is susceptible to remote reading using non-visual means.

According to a second aspect of the present invention there is provided a method of processing security bags which method includes the steps of:
encoding information into a memory device in non-visible form,
retaining the encodable device on or in the bag, and subsequently reading the information from the encodable device.

Thus, such information may include an identification number.

It is preferred that information can be read from the device, irrespective of the orientation of the bag.

In an embodiment, reading means are provided to be susceptible to remote reading and these are connected to the device via conducting means.

In a variation of this embodiment, the conducting means is arranged to break when an attempt is made to gain access to the bag. This may be achieved by having the means pass across a seal of the bag. The means may be weaker than the means used for sealing.

In a particularly preferred embodiment, the encodable device is an electronically readable tag. Thus, the tag may be read by a suitable remote decoder which can, for example, interrogate the tag by means of electromagnetic radiation and which can identify the tag by means of its encoded identification number. The decoder would supply all the signals necessary for accessing the tag and allow the information obtained to be read by a user. Any bag including such a tag can therefore be identified without the need for the bag to be handled.

In a preferred embodiment of the invention, the encodable device is further susceptible to remote encoding of information. Thus, details of the contents of the bag may be remotely encoded into the device.

The electronically readable tag of the present invention desirably comprises an electromagnetic or inductive coil in combination with a microchip which includes a suitable form of memory, preferably non-volatile, and, if necessary, memory addressing means. Suitable tags include those sold under the trade name MICROTAG by UKID Systems Ltd, Riverside Industrial Park, catterall, Preston, Lancashire. The present invention is not, however, limited to such microchips and coils and other encodable devices, for example magnetically encodable devices, may be appropriate in particular applications.

It is clearly desirable that the encodable devices should be securely attached to, or retained in the bag so that it does not become detached in use. In some uses, it will further be necessary to ensure that the encodable device cannot be deliberately detached whilst the bag is in use, in order, for example, to make a false record thereof. In the case of security bags, it is undesirable for the encodable device to be directly adhered to the wall of the bag as this can provide a site for tampering with the bag wall. It is therefore desirable to incorporate the encodable device into the body of the security closure of the bag. Thus, the encodable device is made as difficult to remove, or tamper with, as the security closure itself.

The conducting means may, however, be attached to the wall of the bag, particularly around the portion containing the seal. The seal may be a fragile conductive material such as thin metallic foil or film or even conductive printing ink.

According to a further aspect of the present invention there is provided a method of inserting a device encodable with information, connected by conducting means to electronic remote reading means, into a security bag with a seal, comprising the step of laying the conducting means across the adhesive medium of the seal.

For a better understanding of the invention, and to show how the same may be carried into effect, reference will now be made to the following drawings, in which.

Figure 1:
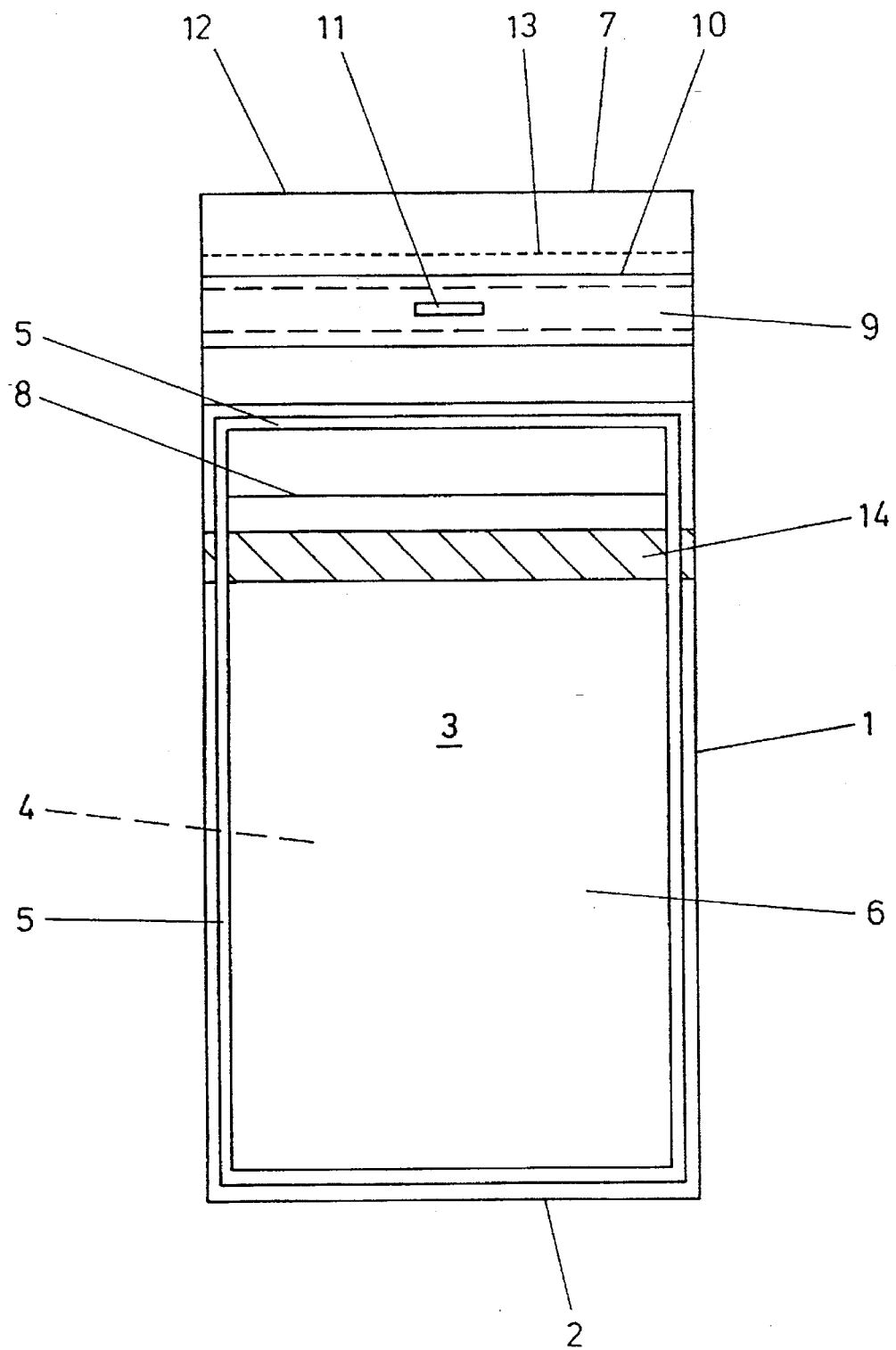
FIG. 1 is a diagrammatic front view of an open bag in accordance with one embodiment of the present invention.
Figure 2:
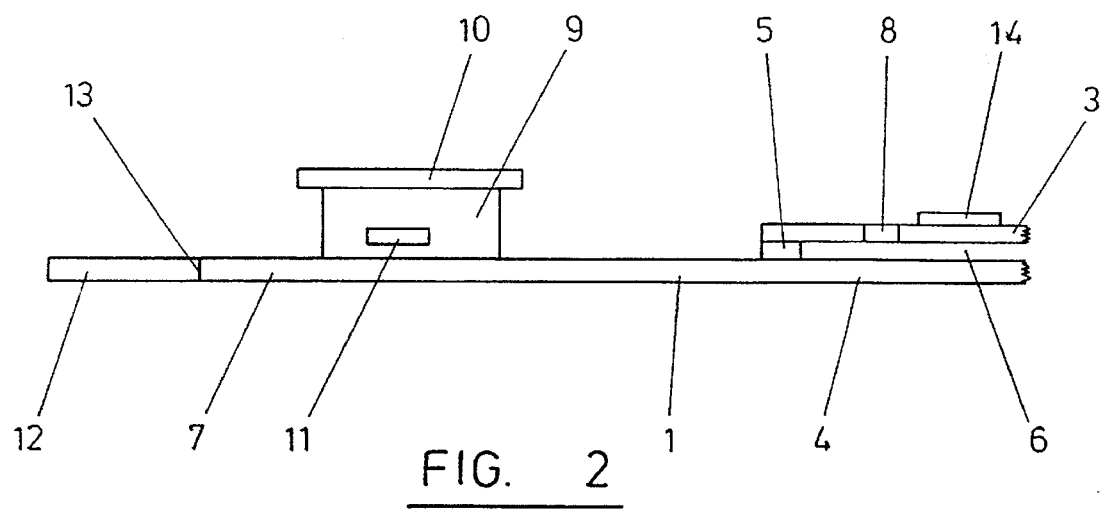
FIG. 2 is a diagrammatic section through a part of the bag of FIG. 1 on an enlarged scale.
Figure 3:
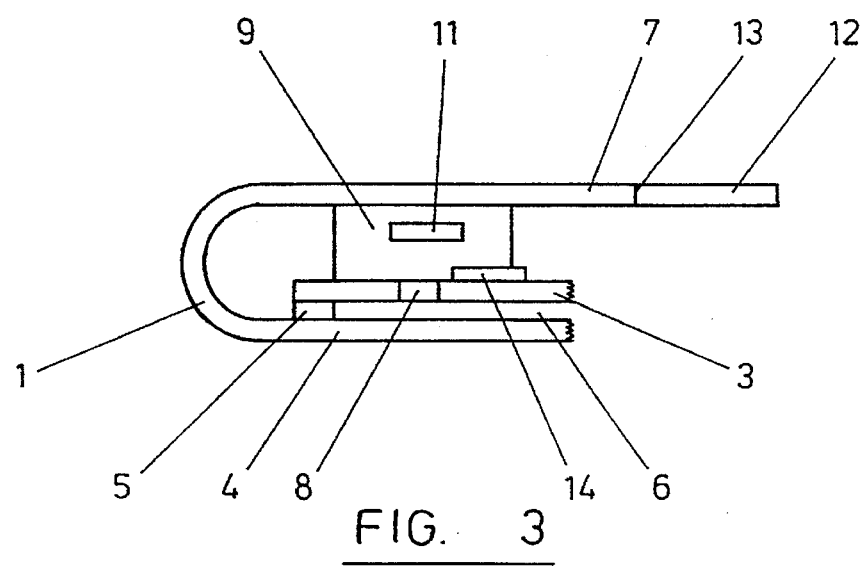
FIG. 3 is a diagrammatic section showing the bag of FIG. 2 when closed and, FIG. 4 is a diagrammatic section through a bag in accordance with another embodiment of the present invention.

Referring now to FIGS. 1, 2 and 3 the bag is formed from a single strip 1 of flexible thermoplastic sheet material such as polyethylene or polypropylene which is folded laterally along a fold line 2 to form a first portion 3 and a second portion 4. The thermoplastic sheet material is preferably transparent, partially transparent, or a combination of opaque and transparent so as to make it easier to see the evidence of tampering. The folded portions 3 and 4 are heat welded to each other in zone 5 which extends parallel with and close to each of the longitudinal and each of the lateral edges of the portions to produce an envelope-like bag 6 wherein the second portion 4 is longer than the first portion 3 and has a part in the form of an integral flap 7 forming a closure member.

At an end region of the bag 6 closer to the closure member 7 an opening line in the form of slit 8 extends across the first portion 3 terminating at each end at the weld zone 5. The slit 8 provides access to the interior of the bag 6. An adhesive 9 is applied across the full width of a part of the flap 7. The adhesive is desirably a high-tack pressure sensitive adhesive, for example a silicone rubber adhesive which may be fully or partially cured. A releasable cover strip 10, (for example formed from corrugated PVC tape) is applied over the adhesive band 9. (The thickness of the adhesive band 9 is exaggerated for reasons of clarity).

As is particularly apparent from FIGS. 2 and 3, the encodable device 11 is bonded into the closure by means of the adhesive 9.

A line of perforations 13 is preferably provided across the flap 7 to provide a tear-off receipt strip 12 which can be detached by tearing along the perforations 13.

In use, of the bag, the items to be held in the bag are introduced into the interior through the slit 8. The cover strip 10 is then removed from the adhesive band 9 and the flap 7 is folded over onto the portion S, with the fold line being close to the laterally extending part of the weld zone 5. The disposition of the adhesive band 9 relative to the fold line for the flap 7 is such that when the flap 7 is brought down onto the portion 3, the part of the flap 7 carrying the adhesive band 9 straddles the slit 8 so that the slit 8 is completely overlain by that part of the flap 7 and the band 9, as illustrated in FIG. 3. Thus, the slit is completely sealed and there is no access opening whatsoever to the interior of the bag 6.

The encodable device of the bag may bear a pre-encoded identification number, of which a separate record is made, against which record the identification number of the device may be checked when the bag reaches its destination. Alternatively, when the contents of the bag are known, information containing details of these contents, and an identification number, may be encoded onto the device when the bag is sealed. This information can then be read and checked against a record when the bag reaches its destination. Further security measures, as known in the art, may be included in the bag 6, of which the following are examples only. Thus, the properties of the adhesive 9 may be such that it is not possible to lift the flap 7 from the opening, remove the contents of the bag 6, and reseal the flap 7 over the opening without this being evident even if the bag is subjected to extremes of hot and/or cold temperatures. A band 14 of security printing may be applied across the outer face of portion 3. The band 14 extends across the full width of the portion 3 at such a position longitudinally thereof as to be immediately adjacent the adhesive band 9 when the flap has been brought into its sealing position over the slit 8. The security printing is suitably applied in two inks, one comprising a hydrocarbon base and one comprising a hydrocarbon-free base. Thus, should an attempt be made to release the adhesive bond at the band 9 using a chemical solvent, this fact will be evidenced by the disturbance of at least one of the inks by the solvent. The weld zone may be embossed over its full extent so that it is made impossible to gain access to the interior of the bag 6 across the zone 5 and then re-seal the bag without the fact being made visually discernible by the consequent distortion of the form of the embossment. A line of perforations (not shown) may be provided across the flap 7 centrally of the adhesive band 9 so that any attempt to lift the flap 7 from the bag 6 is likely to be evidenced by tearing of the flap 7 at these perforations.

Thus, when the encodable device is incorporated into the closure, and any of the above or other suitable security measures are provided, any attempt to tamper with the encodable device, or with the closure, will become visually readily apparent.

Figure 4:
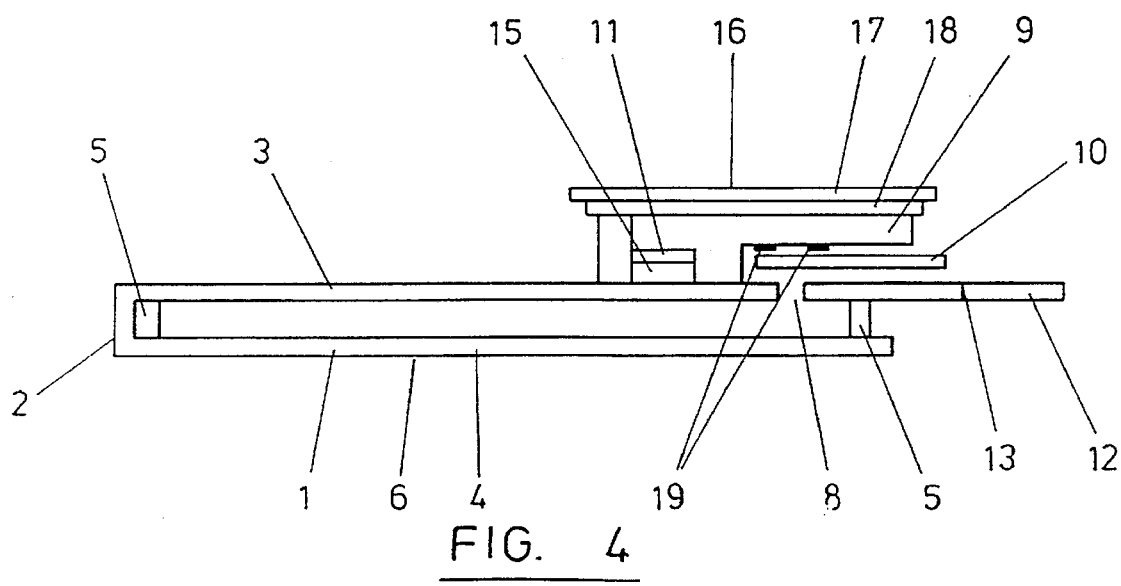

Reference is now made to FIG. 4 in which parts corresponding to parts of FIGS. 1 to 3 are denoted by like reference numerals. In this Figure, the band of adhesive 9 is applied to the upper portion 3 and straddles the slit 8. The adhesive is prevented from contacting the regions adjacent the slit 8 by a removable cover strip 10, which is removed to enable the bag to be sealed.

The encodable device 11, which may, for example be an electromagnetic or inductive coil in combination with a microchip, is coated with a pressure sensitive adhesive 15 and thereby bonded to the upper portion 3 and is retained within the closure 16 by means of the adhesive 9. The encodable device 11 is preferably encapsulated in a suitable plastics material. The closure 16 comprises a substrate 17 which carries the adhesive 9 and desirably also carries security printing 8 which will provide a visible indication of tampering. Further security printing 19 may be applied to the free surface of the adhesive and may incorporate any desired wording or logo.

Figure 5:
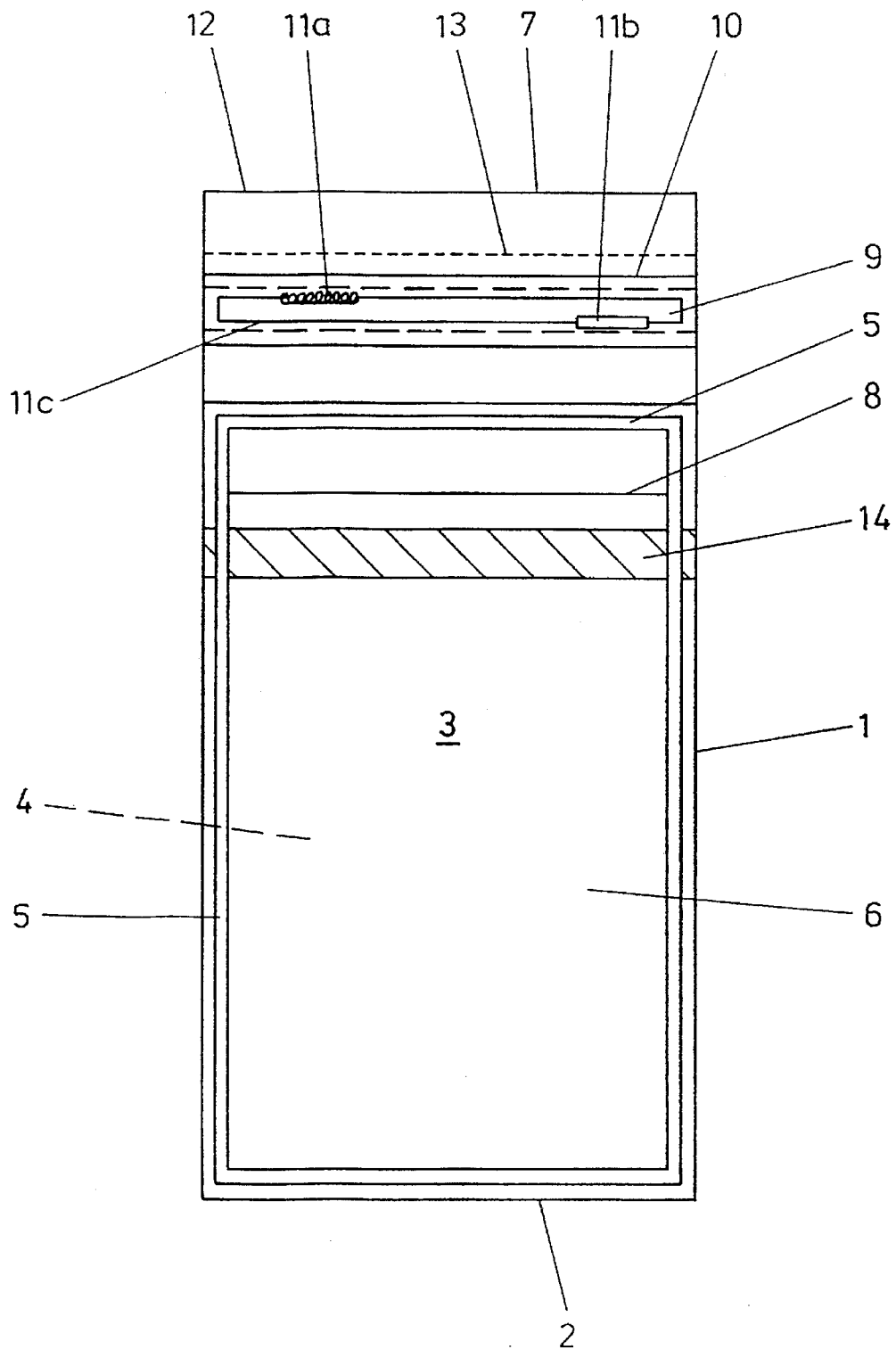
FIG. 5 is a diagrammatic front view of an open bag in accordance with a third embodiment of the present invention.

FIG. 5 shows a bag in accordance with a third embodiment of the invention. In this case the tag is split into its component parts, the inductive loop 11a, and the encoding chip 11b, connected by a conductor 11c. The conductor 11c can be, for example, a very fine wire. Alternatively it may be a thin metallic film or even a strip of conductive ink. The conductor is applied to the region of the bag covered by the adhesive 9 in such a way as to extend over the bag opening 8. The conductor is designed to have a breaking strength which is lower than that of the adhesive. This may be achieved by choice of the material for the conductor or alternatively by providing notches or other forms of weakening into the conductor. Hence any attempt to enter the bag by breaking the seal results in breakage of the conductor. Thus the tag fails to respond to the RF field applied. As a result the tab presents evidence of tampering.

Figure 6:
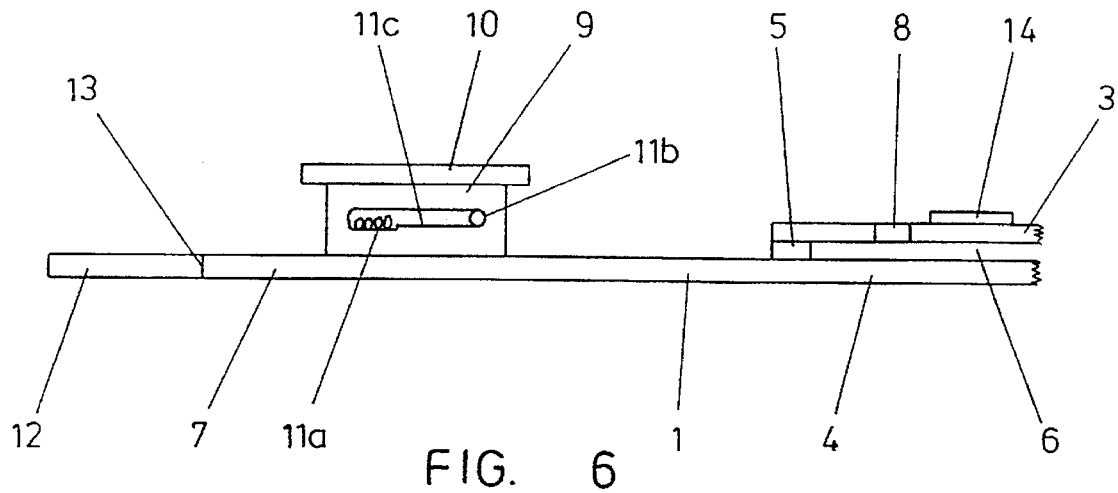
FIG. 6 is a diagrammatic section through a part of the bag of FIG. 5 on an enlarged scale.
Figure 7:
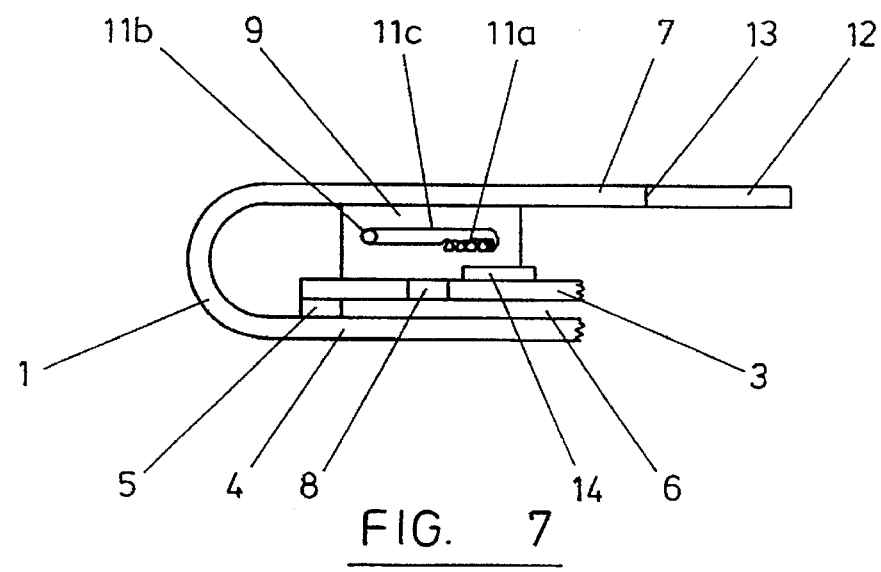
FIG. 7 is a diagrammatic section showing the bag of FIG. 6 when closed and, FIG. 8 is a diagrammatic section through a bag in accordance with a fourth embodiment of the present invention.

FIGS. 6 and 7 show the parts of the encodable device, 11a, 11b and 11c, bonded into the closure by means of the adhesive 9.

Figure 8:
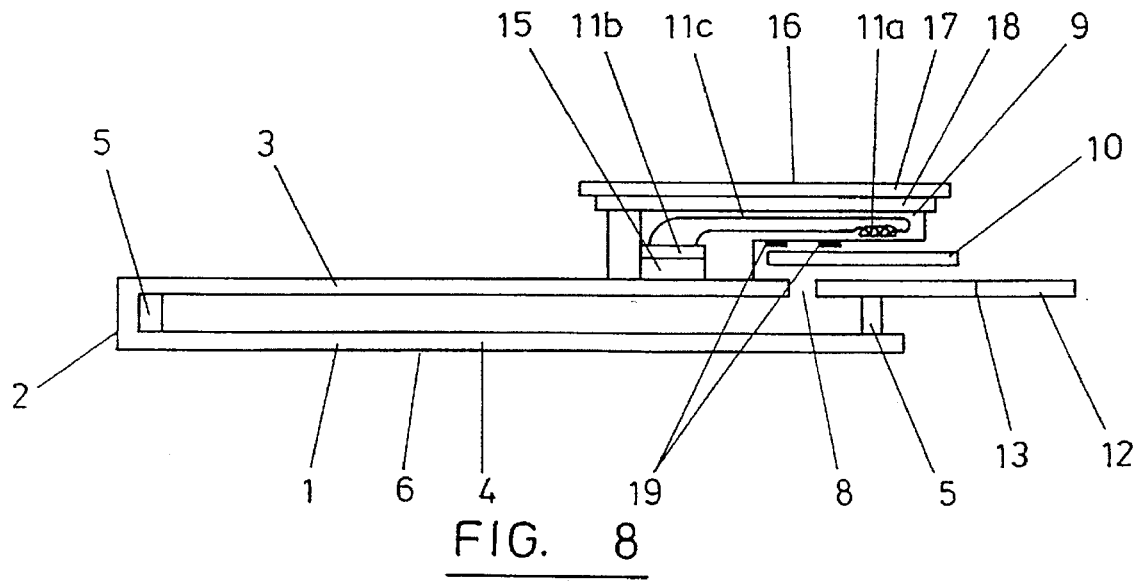

FIG. 8 shows an embodiment in which the tag, in the form of three separate but inter-connected parts, 11a, 11b and 11c as above, is made into the bag of FIG. 4. The band of adhesive 9 is applied to the upper portion 3 and straddles the slit 8. The adhesive is prevented from contacting the regions adjacent the slit 8 by a removable cover strip 10, which is removed to enable the bag to be sealed.

The encoding chip 11b, is coated with a pressure-sensitive adhesive 15 and thereby bonded to the upper portion 3. It is retained within the closure 16 by means of the adhesive 9. The inductive coil 11a is sited in the adhesive band 9 at a point at some distance from the encoding chip 11b. The two are connected by means of the conductor 11c which again is embedded in the adhesive 9. Any attempt to interfere with the closure should break the conductor 11c, which is of lower breaking strength than the adhesive 9. The tag is thus rendered unreadable and tamper evidence is provided.

Further security features may be provided as is known in the art.

Thus, it can be seen that by means of the present invention, bags and in particular security bags can be rapidly and accurately identified, the identification can be made irrespective of the orientation of the bag and without the need for manual handling. The speed of processing such bags is thus markedly increased.

I claim:

1. A bag comprising:

a body portion defining an interior region, said body portion also defining an opening in communication with the interior region;

a seal disposed across the opening defined by said body portion to thereby close the opening and seal the interior region defined by said body portion, wherein said seal is comprised of a sealing material having a first predetermined breaking strength; and an encodable device disposed within said seal, said encodable device comprising:

memory means for storing predetermined data in a non-visible form;

reading means, operably connected to said memory means, for responding to remote interrogation of said encodable device; and a conductor which extends at least partly through said seal to operably connect said memory means and said reading means, wherein said conductor has a second predetermined breaking strength, less than the first predetermined breaking strength of said seal, such that said conductor will break if said seal is removed from the opening to thereby disconnect said memory means and said reading means so as to prevent said reading means from responding to further remote interrogation of said encodable device.

2. A bag according to claim 1 wherein said conductor is selected from the group consisting of a wire, a metallic film, a metallic foil and a conductive ink strip.

3. A bag according to claim 1 wherein said reading means is selected from the group consisting of an electromagnetic coil and an inductive coil.

4. A bag according to claim 1 wherein said encodable device further comprises memory addressing means, responsive to said reading means and operably connected to said memory means, for accessing predefined portions of said memory means.

5. A method of electronically tagging a bag comprising the steps of:

providing a bag defining an interior region and an opening in communication with the interior region;

providing a seal on the bag which is adapted to be extended across the opening defined by the bag to thereby close the opening and seal the interior region;

storing predetermined data relating to the bag in a non-visible form in an encodable device, wherein the encodable device comprises memory means, reading means and a conductor that operably connects the memory means and the reading means, and wherein said storing step comprises the step of storing predetermined data relating to the bag in a non-visible form in the memory means of the encodable device;

disposing the encodable device within the seal such that the encodable device is securely attached to the bag, wherein said disposing step comprises the step of extending the conductor of the encodable device at least partly through the seal;

remotely interrogating the encodable device to access the at least portions of the predetermined data stored by the memory means of the encodable device, wherein said step of remotely interrogating the encodable device comprises the steps of transmitting interrogation signals to and receiving responsive signals from the reading means of the encodable device; and providing an electronic indication if the seal is removed from the opening defined by the bag, wherein said step of providing an electronic indication comprises the step of breaking the conductor if the seal is removed from the opening such that the memory means and the reading means are disconnected to thereby prevent the reading means from responding to further remote interrogation signals.

* * * * *

UNITED STATES PATENT AND TRADEMARK OFFICE
CERTIFICATE OF CORRECTION

PATENT NO. : 5,635,917
DATED : June 3, 1997
INVENTOR(S) : Victor Todman

It is certified that error appears in the above-identified patent and that said Letters Patent is hereby corrected as shown below:

On the title page, Column 1, in the Inventor's address after "Histon," insert --Cambridge,--.

On the title page, Column 1, where reference is made to § 102(e) Date:, delete "Nov. 3, 1993" and insert --Nov. 3, 1994-- therefor.

Column 2, line 19, delete "catterall" and insert --Catterall-- therefor.

Column 3, line 33, delete "S" and insert --3-- therefor.

Column 4, line 31, delete "8" and insert --18-- therefor.

Signed and Sealed this

Nineteenth Day of May, 1998

Attest:

BRUCE LEHMAN

*Attesting Officer*    *Commissioner of Patents and Trademarks*